United States Patent [19]
Sovran

[11] Patent Number: 6,042,301
[45] Date of Patent: Mar. 28, 2000

[54] RIVER BANK FLOOD BARRIER

[76] Inventor: Jean-Paul Sovran, BIO, F-82000 Montauban, France

[21] Appl. No.: 08/983,425

[22] PCT Filed: Jul. 15, 1996

[86] PCT No.: PCT/FR96/01094

§ 371 Date: Jan. 2, 1998

§ 102(e) Date: Jan. 2, 1998

[87] PCT Pub. No.: WO97/04177

PCT Pub. Date: Feb. 6, 1997

[30] Foreign Application Priority Data

Jul. 17, 1995 [FR] France .................................. 95 08596

[51] Int. Cl.[7] ................ E02B 7/14; E04B 2/00; E04B 17/16; E04B 17/22; E04H 12/22

[52] U.S. Cl. ............................ 405/112; 405/114; 256/19; 52/780

[58] Field of Search .......................... 405/16, 107, 110, 405/112, 114, 116, 117, 284, 285; 52/169.1, 169.3, 169.4, 780, 781; 256/19

[56] References Cited

U.S. PATENT DOCUMENTS

| | | | |
|---|---|---|---|
| 830,437 | 9/1906 | Humphrey | 405/113 |
| 1,079,113 | 11/1913 | Conzelman | 52/479 |
| 1,714,949 | 5/1929 | Collier et al. | 405/253 |
| 2,315,516 | 4/1943 | Gray | 256/1 |
| 3,381,483 | 5/1968 | Huthsing, Jr. | 405/262 |
| 3,728,862 | 4/1973 | Meredith | 405/285 |
| 4,050,254 | 9/1977 | Meheen et al. | 405/285 |
| 4,804,299 | 2/1989 | Forte et al. | 405/285 |
| 4,913,594 | 4/1990 | Sigourney | 405/285 |
| 5,118,217 | 6/1992 | Younes | 405/114 |

FOREIGN PATENT DOCUMENTS

| | | |
|---|---|---|
| 0 163 292 | 12/1985 | European Pat. Off. . |
| 2 259 187 | 8/1975 | France . |
| 2 158 977 | 6/1973 | Germany . |
| 9 201 601 | 4/1994 | Netherlands . |

Primary Examiner—Eileen Dunn Lillis
Assistant Examiner—Tara L. Mayo
Attorney, Agent, or Firm—Young & Thompson

[57] ABSTRACT

A barrier forming a temporary dam that may be erected quickly alongside a river in spate to protect a flood-prone area. The barrier (11) mainly consists of extractable piles (15) fitted in holes in the ground, and removable water-tight members (20) that may be mounted between the piles once they have been drawn out of the respective holes. The water-tight members may be made of a stack of metal beams and thick bars.

11 Claims, 3 Drawing Sheets

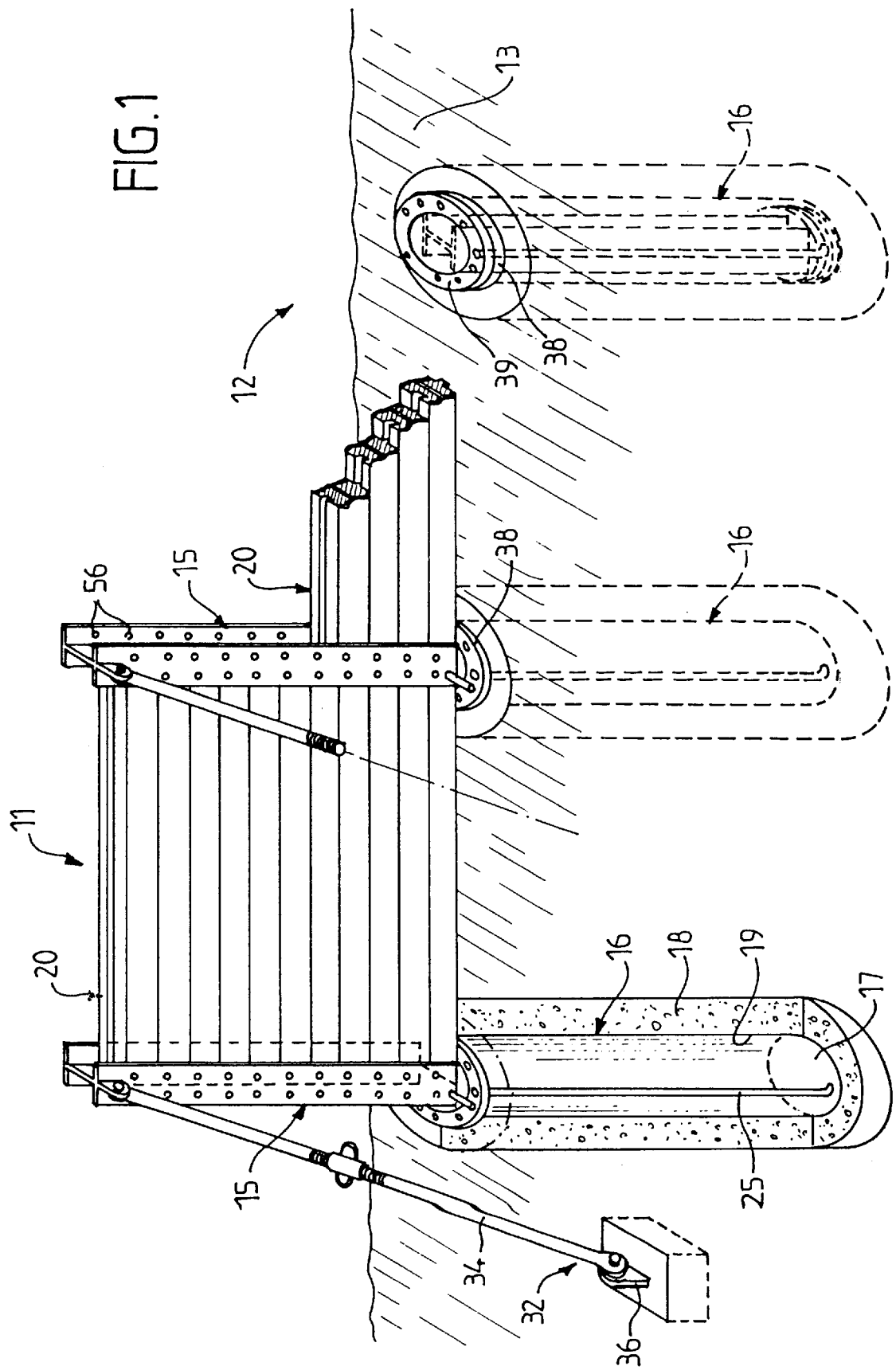

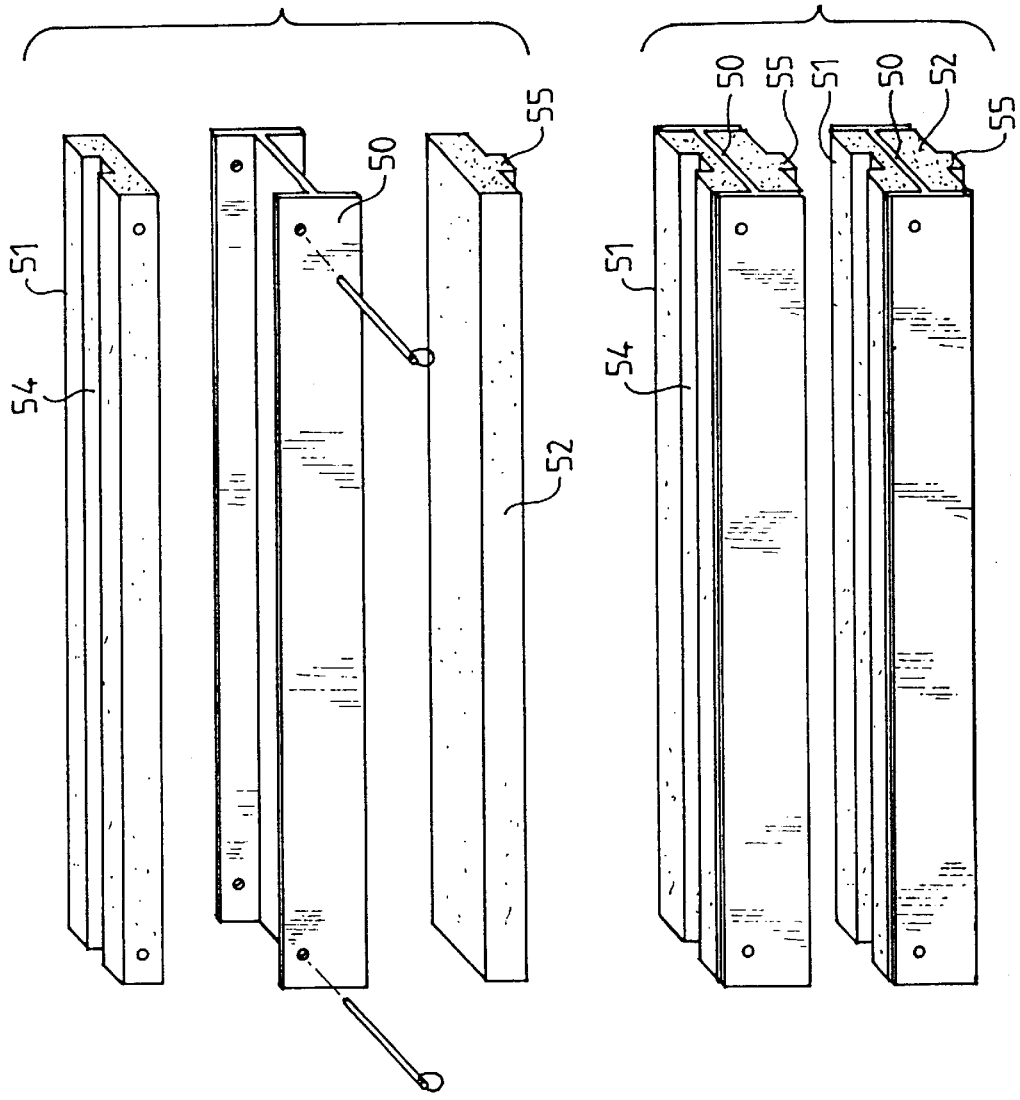
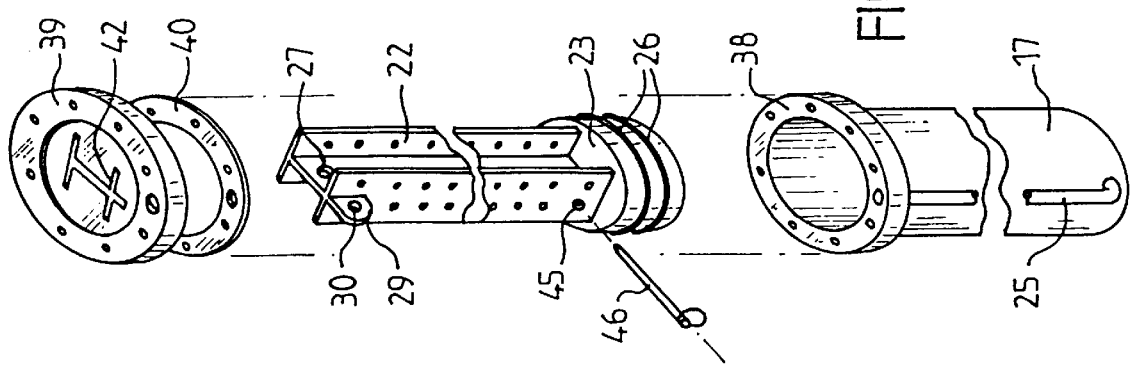

RIVER BANK FLOOD BARRIER

FIELD OF THE INVENTION

The invention relates to a river bank flood barrier forming a temporary dam, adapted to be raised in a short time, for example along a river in spate, to protect a flood-prone area.

BACKGROUND OF THE INVENTION

In times of flood, it can be known several hours in advance whether a river will overflow its banks and flood inhabited regions. The invention permits putting this time to good use to construct a temporary dam hereinafter called a flood barrier, whose infrastructure is already pre-established between the river bed and the flood-prone region.

SUMMARY OF THE INVENTION

More particularly, the invention relates thus to a river bank flood barrier for the prevention of floods, comprising at least one hole (16, 60) provided in the ground at the edge of a flood-prone region, and at least withdrawable portions of a dam (15, 62) installed in such holes, characterized in that it comprises a plurality of erectable pillars (15), each pillar being installed in such a hole, and sealed barriers (20) mounted and held between said pillars.

According to one embodiment, there is provided a plurality of erectable pillars, installed in holes provided in the ground at the edge of the flood-prone region and sealed removable barriers adapted to be installed between said pillars when the latter are raised from their respective holes, above the ground level.

As mentioned above, the construction can be built along a river but also along the sea to protect the land or a road, during high seas.

In the construction described above, each pillar comprises for example a metallic portion of H cross section forming a holding structure for two said barriers. Each barrier can be itself constituted by a stack of metallic beams and thick laths of elastomeric material. Preferably, each metallic beam has an H shaped profile and, on opposite sides of the central core of this beam, are built in a lath comprising a longitudinal groove and a lath comprising a longitudinal rib, said rib and said groove interfitting respectively into a groove and rib of two other laths incorporated in adjacent metallic beams. The sealed barrier can thus also be provided with a stack of such elements between two pillars, constituted of metallic beams and laths of elastomer material. These elements can be stored nearby or brought by truck at the time of construction of the flood barrier.

As a modification, the barriers installed between the erectable pillars can be disposed in trenches provided between the respective holes of the pillars.

BRIEF DESCRIPTION OF THE DRAWINGS

The invention will be better understood and other advantages of the latter will become more apparent in the light of the description which follows, given solely by way of example and with reference to the accompanying drawings, in which:

FIG. 1 is a fragmentary perspective view of a flood barrier according to the invention, shown at the time of use;

FIG. 2 is an exploded detailed perspective view of the principal elements of an erectable pillar;

FIG. 3 is an exploded detailed perspective view of a constituent element of a sealed barrier adapted to be mounted between two erectable pillars;

FIG. 4 is a detailed perspective view showing such elements about to be assembled.

DETAILED DESCRIPTION OF THE INVENTION

Figure 5:
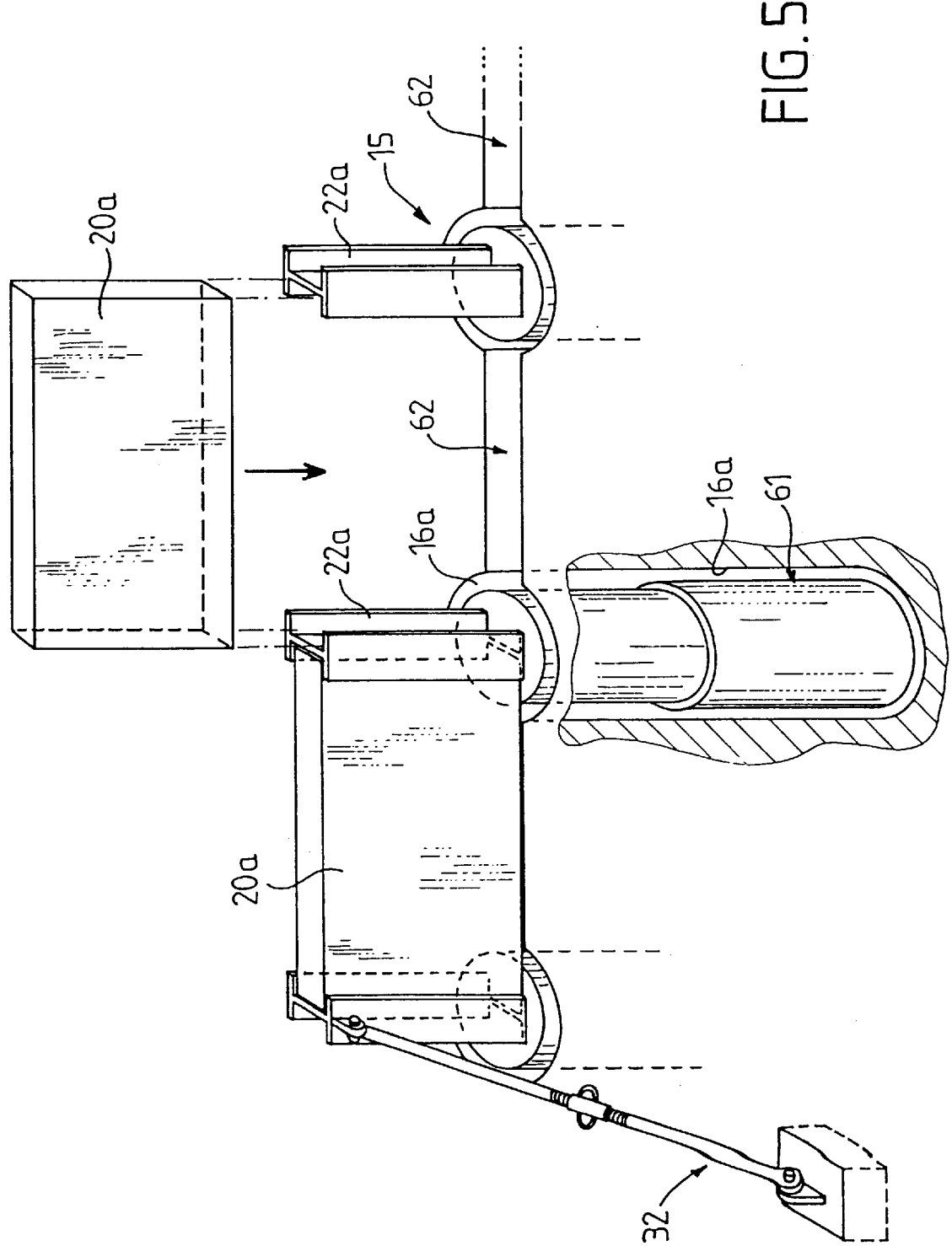
FIG. 5 is a view similar to FIG. 1, showing a modification.

The flood barrier 11 according to a possible embodiment of the invention, constitutes a linear barrier which can extend over several hundreds of meters, even several kilometers, along a river 12 on the bank 13, to protect a flood-prone region, typically an inhabited region, in case of the river being highly in spate. The function of this flood barrier is hence to raise artificially the level of the bank to avoid the river overflowing its banks.

To do this, a retractable infrastructure is installed permanently along the bank, which is to say more generally along the edge of the flood-prone region. This infrastructure comprises a plurality of erectable pillars 15, disposed at regular intervals, installed in respective holes 16 provided in the ground at the edge of the flood-prone region, in this case along the bank 13. In the example, each hole is constituted by a cylindrical vat 17, in this case metallic, sealed by concrete 18 in a vertical hole 19 provided in the ground. The bottom of the metallic vat is closed. Its upper opening is at ground level.

Sealed disassemblable barriers 20 are adapted to be installed between said pillars 15 when the latter are raised vertically outside their respective holes 16, above the ground level. Each pillar 15 is principally constituted by a portion 22 of H shaped cross section oriented vertically and forming a holding structure for two mentioned barriers 20, extending on opposite sides of said section. The parallel sides of the section 22 are disposed parallel to the bank. In this way, said section forms a slideway receiving the ends of two barriers. In the described embodiment, the lower portion of the pillar forms a piston 23 adjusted to the interior wall of the vat 17 and injection means for a fluid under pressure into the vat are provided such that the assembly of the vat and said piston constitute a lifting jack for the corresponding extensible pillar. According to the example, there is provided a conduit 25 installed between the surface and the lower portion of the vat to inject air or hydraulic fluid under pressure, permitting raising the pillar automatically and without effort. As shown, the lower portion of the section 22 is fixed, for example welded, to the piston 23. The cylindrical side surface of this latter is provided with annular sealing joints 26 in contact with the internal wall of the vat. An axis hole 27 is nevertheless provided at the upper portion of the metallic section 22, for manually raising the pillar in case no pressure source is available. Moreover, each metallic section 22 comprises in its upper portion a securement means, here constituted by a simple welded tongue 29, provided with a hole 30, whilst a stay 32, for example constituted by a simple metal rod 34, is mounted between this securement means and an anchoring shoe 36, or like structure, sealed to the ground at a point spaced from the vat such that said stay plays the role of a buttress for the pillar 15, permitting it to resist the water pressure. In the example, the rod 34 comprises two parts with screw-threaded ends, connected by a tapped sleeve, to render its length adjustable.

The metallic vat 17 is provided with an annular closure flange 38 disposed at ground level, on which is screwed a metallic cap 39. This latter comprises an H shaped slot 42 serving to guide the metallic section 22 and preventing the piston 23 from escaping. The cap is screwed on the flange 32 with the interposition of a flat joint 40 of elastomeric material, for sealing in the raised position. The joint 40 is compressed between the piston 23 and the cap 39. This arrangement effectively protects the assembly of the buried elements against infiltration and hence avoids corrosion of these latter.

A hole 45 is provided at the lower portion of the H shaped section 22 above the piston 23, to receive a blocking pin 46 permitting holding the pillar 15 in raised position, after raising, when the pressure in the jack has been released.

Moreover, each barrier 20, which is to say the raised portion of the flood barrier between two adjacent pillars, is preferably constituted by a stack of metallic beams 50 and slats 51, 52 of elastomeric material. More precisely, each metallic beam 50 has an H shaped cross section and on opposite sides of the central core of this beam, are secured a lath 51 comprising a longitudinal groove 54 and a lath 52 comprising a longitudinal rib 55. The rib and the groove interfit respectively in a groove and rib of two other laths secured to adjacent metallic beams. The sides of each metallic section forming a pillar are pierced by holes 56, whilst the beams and the laths have corresponding holes such that each element as shown in FIG. 4 may be fixed to the pillars between which it is mounted.

The flood barrier is erected in the time preceding the spate. The pillars are raised as indicated above, after having removed the caps 39, by injection of fluid under pressure into the jacks. The metallic sections of H shaped profile 22 are then blocked in raised position thanks to the pins 46 and the rods 34 are fixed between these sections and the anchoring shoes 36. The constituent portions of the barriers are then stacked, as shown in FIGS. 3 and 4, between the slideways of the sections 22.

In FIG. 5, analogous structural elements bear the same reference numerals as in FIG. 1. There will thus be seen a plurality of erectable pillars 15, between which are installed sealed barriers 20a, each barrier being in this case a single block. As in the preceding example, the pillar is constituted by a section 22a with an H shaped cross section mounted on a buried jack 61. The thickness of a barrier 20a corresponds to the distance separating the two parallel flanges of a section with H shaped profile. Each jack 61 is thus a stage hydraulic jack installed at the bottom of a corresponding cylindrical hole 16a, sufficiently deep to shield the section 22a when the jack is retracted.

For each pillar, there is provided the same system of stays 32. The barriers 20a can be stored nearby, as before. However, according to a preferable characteristic, the trenches 62 between the cylindrical cavities 16a are empty, each trench extending from one cavity to the other and sheltering a barrier 20a permanently, apart from the periods of use. Thus, even in periods of non-use, the barrier 20a remains installed between two sections 22a, and the placing of the flood barrier into operative position is hence very rapid. The necessary manual operations resume with the mounting of the stays.

The invention is not limited to the described embodiments.

Particularly, the system of FIG. 5 can be adapted such that the barriers 20a will be preassembled to the prefabricated sections of open casings adapted to be buried to form said trenches. The caissons are disposed end to end between the jack chambers.

I claim:

1. A barrier system extending along a longitudinal direction along an edge of a flood-prone region for the prevention of floods, comprising:

a plurality of erectable pillars, each pillar having a lower portion;

a plurality of holes provided in the ground at the edge of the flood-prone region;

each pillar adapted to be installed in one of the holes;

each hole being constituted by a substantially cylindrical vat having an internal wall, the lower portion of the corresponding pillar forming a piston fitted to the internal wall of said vat;

means for injecting a fluid under pressure into said vat such that an assembly of said vat and said piston constitute a lifting jack for raising the corresponding erectable pillar; and a plurality of sealed members mounted and maintained between said pillars.

2. The barrier system according to claim 1, wherein said sealed members are removable and adapted to be installed between said pillars when said pillars are raised above the ground level, from respective holes.

3. The barrier system according to claim 1, wherein said piston comprises a cylindrical surface provided with sealing joints.

4. The barrier system according to claim 1, wherein each pillar comprises a metallic profile of H-shaped cross section forming a holding structure for two said sealed members.

5. The barrier system according to claim 4, wherein each metallic profile comprises in its upper portion, a securement element, and a stay being mounted between said securement element and an anchoring shoe held in the ground.

6. The barrier system according to claim 1, wherein each member is constituted by a stack of metallic beams and slats of elastomeric material.

7. The barrier system according to claim 6, wherein each metallic beam has an H-shaped cross section and a central core, one of said slats having a longitudinal groove being secured to one side of the central core, and one of said slats having a longitudinal rib being secured to a second opposite side of the central core; said rib and said groove interfitting respectively in a groove and a rib of two other slats secured to adjacent beams.

8. A barrier system extending along a longitudinal direction along an edge of a flood-prone region for the prevention of floods, comprising: a plurality of erectable pillars, each pillar having a lower portion and an H-shaped cross section mounted on an underground jack;

a plurality of holes provided in the ground at the edge of the flood-prone region; each pillar adapted to be installed in one of the holes; and a plurality of sealed members disposed in trenches, and extending between said erectable pillars.

9. The barrier system according to claim 8, wherein each hole is constituted by a substantially cylindrical vat having an internal wall, the lower portion of the corresponding pillar forming a piston fitted to the internal wall of said vat, and means for injecting fluid under pressure into said vat, such that an assembly of said vat and said piston constitute a lifting jack for raising the corresponding erectable pillar.

10. The barrier according to claim 8, wherein said piston comprises a cylindrical surface provided with sealing joints.

11. The barrier according to claim 8, wherein each H-shaped cross section of each erectable pillar comprises in its upper portion a securement element and a stay mounted between said securement element and an anchoring shoe held in the ground.

\* \* \* \* \*